(12) United States Patent
Schulte et al.

(10) Patent No.: US 8,234,927 B2
(45) Date of Patent: Aug. 7, 2012

(54) DIFFERENTIAL PRESSURE SENSOR WITH LINE PRESSURE MEASUREMENT

(75) Inventors: John P. Schulte, Eden Prairie, MN (US); David G. Tyson, Eden Prairie, MN (US); Andrew J. Klosinski, Waconia, MN (US)

(73) Assignee: Rosemount Inc., Eden Prairie, MN (US)

( * ) Notice: Subject to any disclaimer, the term of this patent is extended or adjusted under 35 U.S.C. 154(b) by 64 days.

(21) Appl. No.: 12/796,023

(22) Filed: Jun. 8, 2010

(65) Prior Publication Data
US 2011/0296926 A1 Dec. 8, 2011

(51) Int. Cl.
*G01L 9/12* (2006.01)

(52) U.S. Cl. .......................................... 73/718; 73/724

(58) Field of Classification Search ................ 7/700–756
See application file for complete search history.

(56) References Cited

U.S. PATENT DOCUMENTS

| | | |
|---|---|---|
| 2,533,339 A | 12/1950 | Willenborg |
| 3,012,432 A | 12/1961 | Moore et al. |
| 3,218,863 A | 11/1965 | Calvert |
| 3,232,712 A | 2/1966 | Stearns |
| 3,249,833 A | 5/1966 | Vosteen |
| 3,374,112 A | 3/1968 | Danon |
| 3,410,135 A | 11/1968 | Reynaud |
| 3,557,621 A | 1/1971 | Ferran |
| 3,618,390 A | 11/1971 | Frick |
| 3,697,835 A | 10/1972 | Satori |
| 3,808,480 A | 4/1974 | Johnston |
| 3,924,219 A | 12/1975 | Braun |
| 4,008,619 A | 2/1977 | Alcaide et al. |
| 4,120,206 A | 10/1978 | Rud, Jr. |
| 4,158,217 A | 6/1979 | Bell |
| 4,168,518 A | 9/1979 | Lee |
| 4,177,496 A | 12/1979 | Bell et al. |
| 4,227,419 A | 10/1980 | Park |
| 4,244,226 A | 1/1981 | Green et al. |
| 4,287,553 A | 9/1981 | Braunlich |

(Continued)

FOREIGN PATENT DOCUMENTS
DE 1932899 A1 1/1971
(Continued)

OTHER PUBLICATIONS

Notification of Transmittal of the International Search Report and the Written Opinion of the International Searching Authority, or the Declaration for PCT/US2011/038688 filed Jun. 1, 2011 and mailing date Jul. 22, 2011, 10 pages.

(Continued)

*Primary Examiner* — Andre Allen
(74) *Attorney, Agent, or Firm* — Westman, Champlin & Kelly, P.A.

(57) ABSTRACT

A pressure sensor assembly for sensing a pressure of a process fluid includes a sensor body having a cavity formed therein and first and second openings to the cavity configured to apply first and second pressures. A diaphragm in the cavity separates the first opening from the second opening and is configured to deflect in response to a differential pressure between the first pressure and the second pressure. A capacitance based deformation sensor is provided and configured to sense deformation of the sensor body in response to a line pressure applied to the sensor body.

15 Claims, 5 Drawing Sheets

U.S. PATENT DOCUMENTS

| | | | |
|---|---|---|---|
| 4,322,775 A | 3/1982 | Delatorre | |
| 4,336,567 A | 6/1982 | Anastasia | |
| 4,358,814 A | 11/1982 | Lee et al. | |
| 4,370,890 A | 2/1983 | Frick | |
| 4,389,895 A | 6/1983 | Rud, Jr. | |
| 4,422,125 A | 12/1983 | Antonazzi et al. | |
| 4,422,335 A | 12/1983 | Ohnesorge et al. | |
| 4,434,451 A | 2/1984 | Delatorre | |
| 4,455,874 A | 6/1984 | Paros | |
| 4,458,537 A | 7/1984 | Bell et al. | |
| 4,466,290 A | 8/1984 | Frick | |
| 4,490,773 A | 12/1984 | Moffatt | |
| 4,542,436 A | 9/1985 | Carusillo | |
| 4,562,742 A | 1/1986 | Bell | |
| 4,586,108 A | 4/1986 | Frick | |
| 4,586,382 A | 5/1986 | Sinha | 73/703 |
| 4,604,901 A | 8/1986 | Kagi | |
| 4,623,813 A | 11/1986 | Naito et al. | |
| 4,670,733 A | 6/1987 | Bell | |
| 4,739,666 A | 4/1988 | Hafner et al. | |
| 4,785,669 A | 11/1988 | Benson et al. | |
| 4,860,232 A | 8/1989 | Lee et al. | |
| 4,864,874 A | 9/1989 | Hafner | |
| 4,875,369 A | 10/1989 | Delatorre | |
| 4,878,012 A | 10/1989 | Schulte et al. | |
| 4,926,674 A | 5/1990 | Fossum et al. | |
| 4,951,174 A | 8/1990 | Grantham et al. | |
| 4,977,480 A | 12/1990 | Nishihara | |
| 5,012,677 A | 5/1991 | Shimada et al. | |
| 5,094,109 A | 3/1992 | Dean et al. | |
| 5,144,841 A | 9/1992 | Brouwers et al. | |
| 5,168,419 A | 12/1992 | Delatorre | |
| 5,194,819 A | 3/1993 | Briefer | |
| 5,230,250 A | 7/1993 | Delatorre | |
| 5,233,875 A | 8/1993 | Obermeier et al. | |
| 5,291,795 A | 3/1994 | Hafner | |
| 5,329,818 A | 7/1994 | Frick et al. | |
| 5,469,749 A | 11/1995 | Shimada et al. | |
| 5,471,882 A | 12/1995 | Wiggins | 73/702 |
| 5,492,016 A | 2/1996 | Pinto et al. | |
| 5,524,492 A | 6/1996 | Frick et al. | |
| 5,531,120 A | 7/1996 | Nagasu et al. | |
| 5,542,300 A | 8/1996 | Lee | |
| 5,624,760 A | 4/1997 | Collins et al. | |
| 5,635,649 A * | 6/1997 | Tobita et al. | 73/717 |
| 5,637,802 A | 6/1997 | Frick et al. | |
| 5,642,301 A | 6/1997 | Warrior et al. | |
| 5,705,978 A | 1/1998 | Frick et al. | |
| 5,757,608 A | 5/1998 | Bernot et al. | |
| 5,760,310 A | 6/1998 | Rud, Jr. et al. | |
| 5,911,162 A | 6/1999 | Denner | |
| 5,920,016 A | 7/1999 | Broden | |
| 5,992,240 A | 11/1999 | Tsuruoka et al. | |
| 6,003,219 A | 12/1999 | Frick et al. | |
| 6,279,401 B1 * | 8/2001 | Karas | 73/716 |
| 6,295,875 B1 | 10/2001 | Frick et al. | |
| 6,484,585 B1 | 11/2002 | Sittler et al. | |
| 6,520,020 B1 | 2/2003 | Lutz et al. | |
| 6,654,697 B1 | 11/2003 | Eryurek et al. | |
| 6,662,662 B1 | 12/2003 | Nord et al. | |
| 6,675,655 B2 | 1/2004 | Broden et al. | |
| 6,701,274 B1 | 3/2004 | Eryurek et al. | |
| 7,334,484 B2 | 2/2008 | Harasyn et al. | 73/718 |
| 7,401,522 B2 | 7/2008 | Broden et al. | |
| 7,467,555 B2 * | 12/2008 | Schulte et al. | 73/736 |
| 7,484,416 B1 | 2/2009 | Klosinski et al. | 73/718 |
| 7,543,501 B2 | 6/2009 | Cottles et al. | |
| 7,779,698 B2 * | 8/2010 | Willcox | 73/716 |
| 2002/0178827 A1 | 12/2002 | Wang | |
| 2004/0015069 A1 | 1/2004 | Brown | |
| 2004/0168523 A1 | 9/2004 | Fernald et al. | |
| 2005/0005712 A1 | 1/2005 | Gysling et al. | |
| 2005/0011278 A1 | 1/2005 | Brown et al. | |
| 2005/0041375 A1 | 2/2005 | Rosenau | |
| 2005/0132808 A1 | 6/2005 | Brown et al. | |
| 2006/0206288 A1 | 9/2006 | Brahmajosyula et al. | |
| 2006/0278005 A1 | 12/2006 | Broden et al. | 73/716 |
| 2006/0278007 A1 | 12/2006 | Harasyn et al. | |
| 2009/0078054 A1 * | 3/2009 | Romo | 73/717 |
| 2011/0239773 A1 * | 10/2011 | Klosinski et al. | 73/724 |

FOREIGN PATENT DOCUMENTS

| | | |
|---|---|---|
| DE | 3340834 A1 | 5/1985 |
| DE | 3820878 | 6/1988 |
| EP | 0524550 A1 | 1/1993 |
| WO | 9953286 A1 | 10/1999 |
| WO | WO 00/70321 | 11/2000 |
| WO | WO2006/130425 | 12/2006 |

OTHER PUBLICATIONS

Notification of Transmittal of International Search Report and the Written Opinion of the International Searching Authority, or the Declaration for PCT/US2011/026965 filed Mar. 3, 2011, date of mailing Jul. 12, 2011, 12 pages.

Saturn Line Pressure Sensor Concept, "A Different Way of Getting a Line Pressure Signal From the Saturn Sensor", Rosemount, Saturn LP Concept, Sep. 15, 2008.

International Search Report and Written Opinion of of the International Searching Authority for PCT/US2006/020254.

International Search Report and Written Opinion of the International Searching Authority for PCT/US2006/019955.

* cited by examiner

US 8,234,927 B2

DIFFERENTIAL PRESSURE SENSOR WITH LINE PRESSURE MEASUREMENT

BACKGROUND OF THE INVENTION

The present invention relates to pressure sensors of the type used to measure the pressure of a process fluid. More specifically, the present invention relates to a pressure sensor configured to measure both a differential pressure as well as a line pressure in a process fluid.

Transmitters are used in process monitoring and control systems to measure various process variables of industrial processes. One type of transmitter measures differential pressure of process fluid in the process. This differential pressure measurement can then be used to calculate the flow rate of the process fluid. Various techniques have been used in the pressure sensors used in such transmitters. One well known technique is to use a deflectable diaphragm. A capacitance is measured with respect to the diaphragm, with the diaphragm forming one of the capacitive plates of the capacitor. As the diaphragm is deflected due to applied pressure, the measured capacitance changes. In such a configuration, there are a number of sources of inaccuracies in pressure measurements.

One technique which addresses these inaccuracies is set forth in U.S. Pat. No. 6,295,875 entitled, "PROCESS PRESSURE MEASUREMENT DEVICES WITH IMPROVED ERROR COMPENSATION" issued Oct. 2, 2001 to Frick et al., which is incorporated herein by reference in its entirety. This patent describes a differential pressure sensor that includes an additional electrode for use in reducing measurement inaccuracies. However, in some installations it is desirable to measure a line pressure of the process fluid (absolute or gauge), in addition to a differential pressure measurement.

SUMMARY

A pressure sensor assembly for sensing a pressure of a process fluid includes a sensor body having a cavity formed therein and first and second openings to the cavity configured to apply first and second pressures. A diaphragm in the cavity separates the first opening from the second opening and is configured to deflect in response to a differential pressure between the first pressure and the second pressure. A capacitance based deformation sensor is provided and configured to sense deformation of the sensor body in response to a line pressure applied to the sensor body.

DETAILED DESCRIPTION

The present invention provides an apparatus and method for determining line pressure and differential pressure for a capacitance-based pressure sensor. By computing the ratios of sums, or sums of ratios, of appropriate capacitances in a multi-capacitance based pressure sensor, the differential pressure of the process fluid can be determined. As discussed in the Background section, in some installations it may be desirable to measure a line pressure (absolute or gauge) in addition to a differential pressure measurement. One such technique to measure line pressure is shown and described in co-pending U.S. patent application Ser. No. 11/140,681 entitled "LINE PRESSURE MEASUREMENT USING DIFFERENTIAL PRESSURE SENSOR," filed on May 27, 2005 to Donald E. Harasyn et al., and U.S. patent application Ser. No. 11/138,977 entitled "PRESSURE SENSOR USING COMPRESSIBLE SENSOR BODY", filed on May 26, 2005 to David A. Broden et al., which is commonly assigned with the present application, and whose contents are incorporated herein by reference in their entirety.

Figure 1:
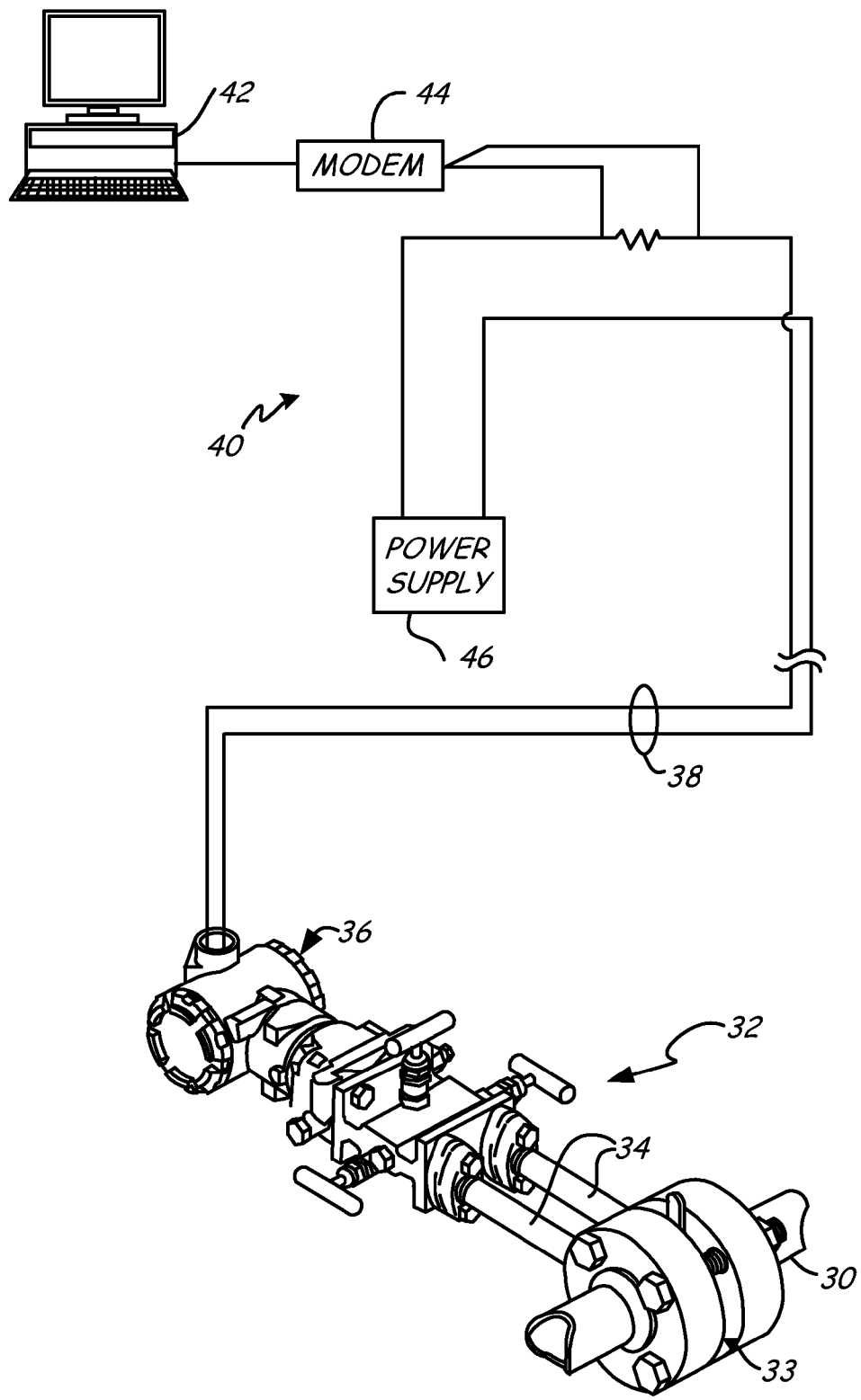
FIG. 1 shows a process measurement system with a process transmitter constructed in accordance with the present invention.

FIG. 1 shows generally the environment of a process measurement system 32. FIG. 1 shows process piping 30 containing a fluid under pressure coupled to the process measurement system 32 for measuring a process pressure. The process measurement system 32 includes impulse piping 34 connected to the piping 30. The impulse piping 34 is connected to a process pressure transmitter 36. A primary element 33, such as an orifice plate, venturi tube, flow nozzle, and so on, contacts the process fluid at a location in the process piping 30 between the pipes of the impulse piping 34. The primary element 33 causes a pressure change in the fluid as it flows past the primary element 33. This pressure change (differential pressure change) is related to the flow of process fluid. A differential pressure sensor can be used to measure this pressure change and measurement circuitry used to provide an output related to the flow of process fluid.

Transmitter 36 is a process measurement device that receives process pressures through the impulse piping 34. The transmitter 36 senses a differential process pressure and converts it to a standardized transmission signal that is a function of the process flow.

A process loop 38 preferably provides both a power signal to the transmitter 36 from control room 40 and bidirectional communication, and can be constructed in accordance with a number of process communication protocols. In the illustrated example, the process loop 38 is a two-wire loop. The two-wire loop is used to transmit all power to and all communications to and from the transmitter 36 during normal operations with a 4-20 mA signal. A computer 42 or other information handling system through modem 44, or other network interface, is used for communication with the transmitter 36. A remote voltage power supply 46 powers the transmitter 36. Another example of a process control loop is a wireless communication in which data is transmitted wirelessly either directly to a central location, or a to mesh network type configuration or using other techniques.

Figure 2:
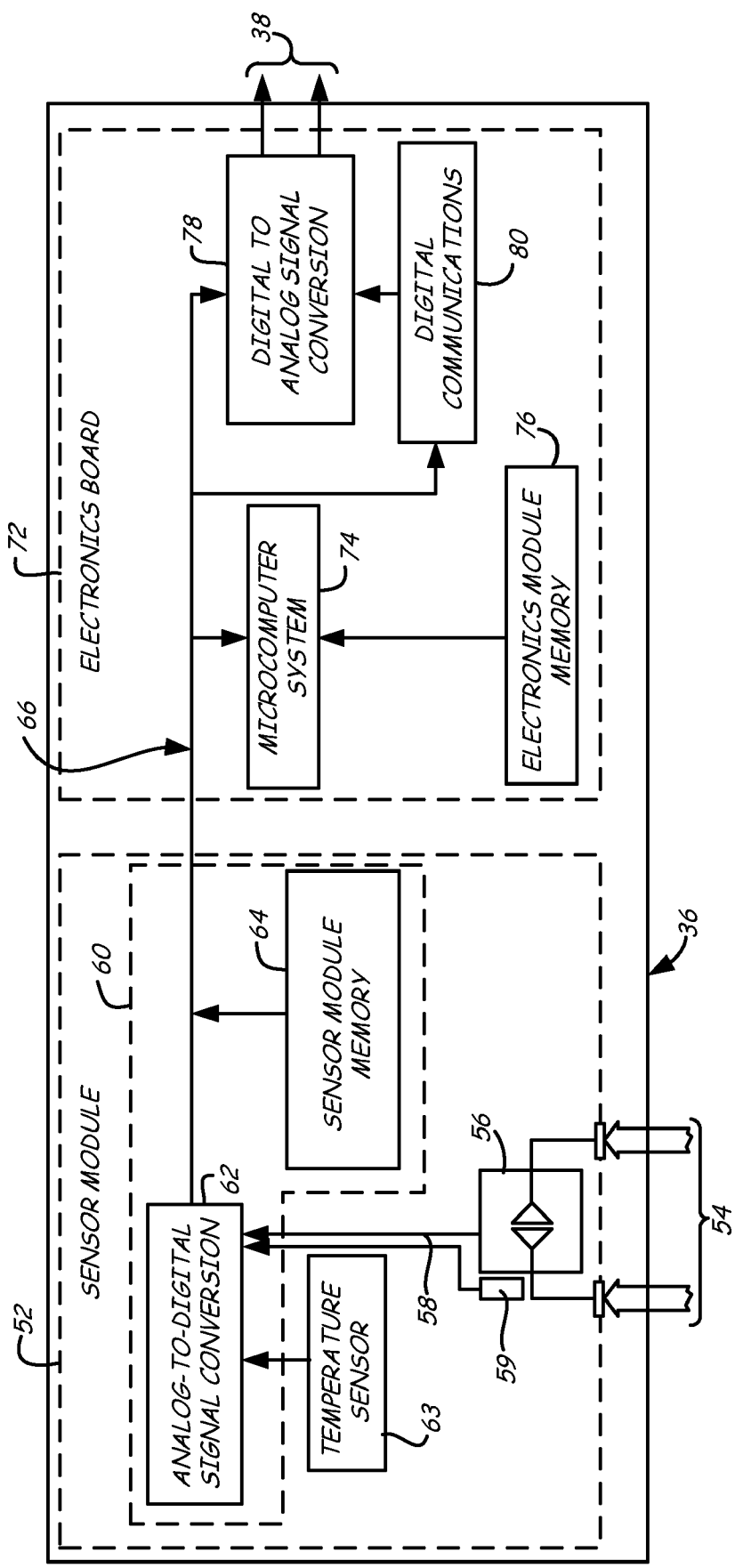
FIG. 2 is schematic view of a transmitter of FIG. 1.

FIG. 2 is a simplified block diagram of one embodiment of pressure transmitter 36. Pressure transmitter 36 includes a sensor module 52 and an electronics board 72 coupled together through a databus 66. Sensor module electronics 60 couples to pressure sensor 56 which receives an applied differential pressure 54. The data connection 58 couples sensor 56 to an analog to digital converter 62. An optional temperature sensor 63 is also illustrated along with sensor module memory 64. The electronics board 72 includes a microcomputer system 74, electronics memory module 76, digital to analog signal conversion 78 and digital communication block 80. An output is provided on loop 38 related to the sensed pressure. FIG. 2 also schematically illustrates an external capacitance based deformation sensor 59 which is located externally to the body of pressure sensor 56 and arranged to provide a capacitance value. The sensor 59 is arranged to have a capacitance value which changes in response to deformation of the body of pressure sensor 56 due to an applied pressure. As illustrated schematically in FIG. 2, a line pressure is applied to the body of pressure sensor 56 due to the application of pressure 54.

In accordance with techniques set forth in U.S. Pat. No. 6,295,875 to Frick et al., pressure transmitter 36 senses differential pressure. However, the present invention is not limited to such a configuration.

Figure 3:
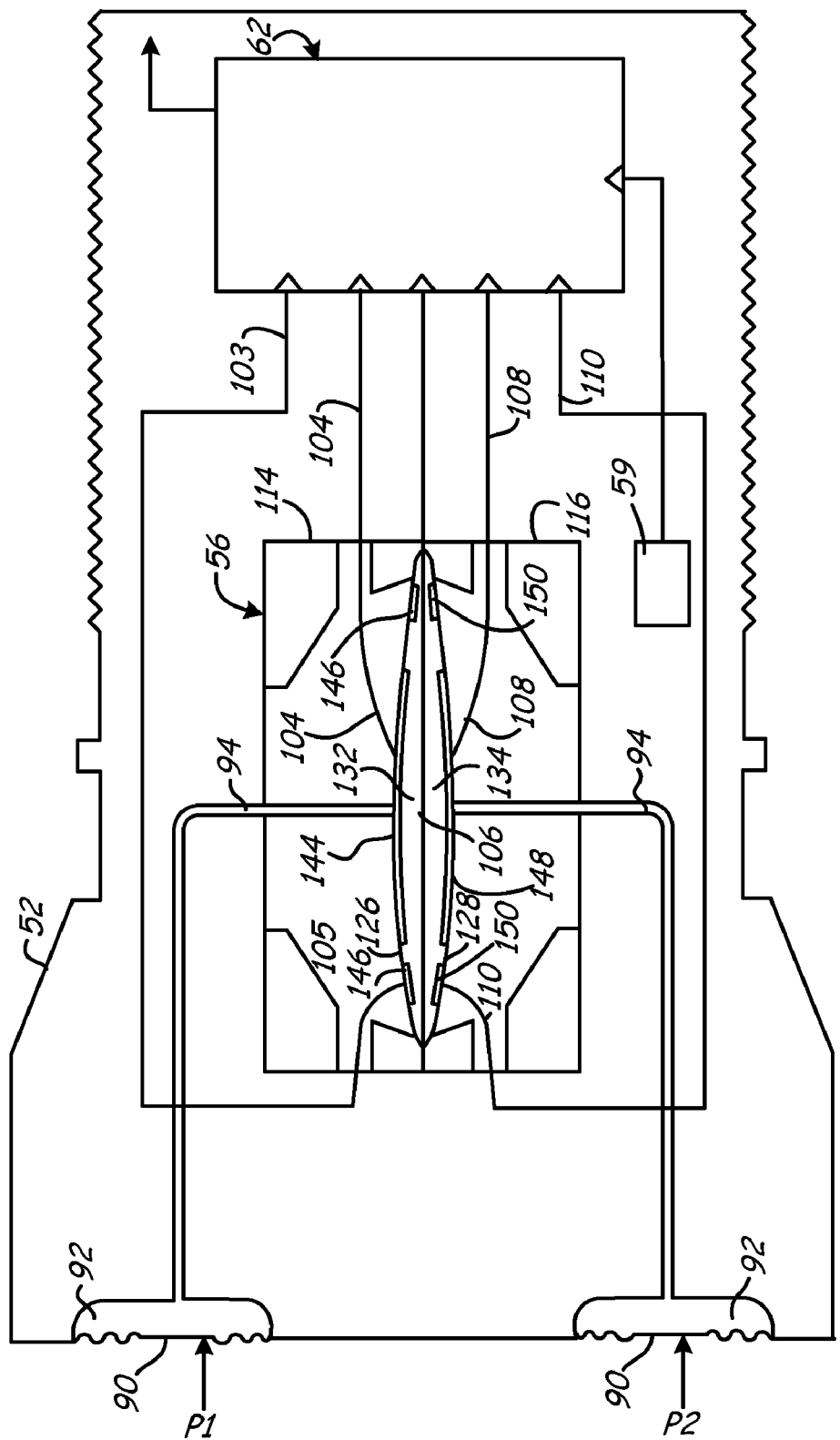
FIG. 3 shows a cross sectional view of a portion of the process transmitter of FIG. 1.

FIG. 3 is a simplified cross-sectional view of one embodiment of a sensor module 52 showing pressure sensor 56. Pressure sensor 56 couples to a process fluid through isolation diaphragms 90 which isolate the process fluid from cavities 92. Cavities 92 couple to the pressure sensor module 56 through capillary tubes 94. A substantially incompressible fill fluid fills cavities 92 and capillary tubes 94. When a pressure from the process fluid is applied to diaphragms 90, it is transferred to the pressure sensor 56.

According to one embodiment, pressure sensor 56 is formed from two pressure sensor halves 114 and 116 and filled with a substantially incompressible solid material 105 such as glass or ceramic. A center diaphragm 106 is disposed within a cavity 132,134 formed within the sensor 56. An outer wall of the cavity 132, 134 carries electrodes 144,146,148 and 150. These electrodes are generally referred to as primary electrodes 144 and 148, and secondary electrodes 146 and 150. These electrodes form capacitors with respect to the moveable diaphragm 106. The capacitors, again, are referred to as primary and secondary capacitors, respectively.

As illustrated in FIG. 3, the various electrodes in sensor 56 are coupled to analog to digital converter 62 over electrical connection 103, 104, 108 and 110. Additionally, the deflectable diaphragm 106 couples to analog to digital converter 62 through connection 109.

As discussed in U.S. Pat. No. 6,295,875, the differential pressure applied to the sensor 56 can be measured using the electrodes 144,146,148 and 150. As discussed below, FIG. 3 schematically illustrates the capacitance based differential pressure 56, which is described below in more detail.

In operation, pressures $P_1$ and $P_2$ press against isolation diaphragm 90 thereby pressing on a substantially incompressible fill fluid which fills the cavity between the center diaphragm 106 and the isolation diaphragm 90. This causes center diaphragm 106 to deflect resulting in a change in capacitance between diaphragm 106 and electrodes 146, 144, 148, and 150. Using known techniques, changes in these capacitances can be measured and used to determine differential pressure.

Figure 4:
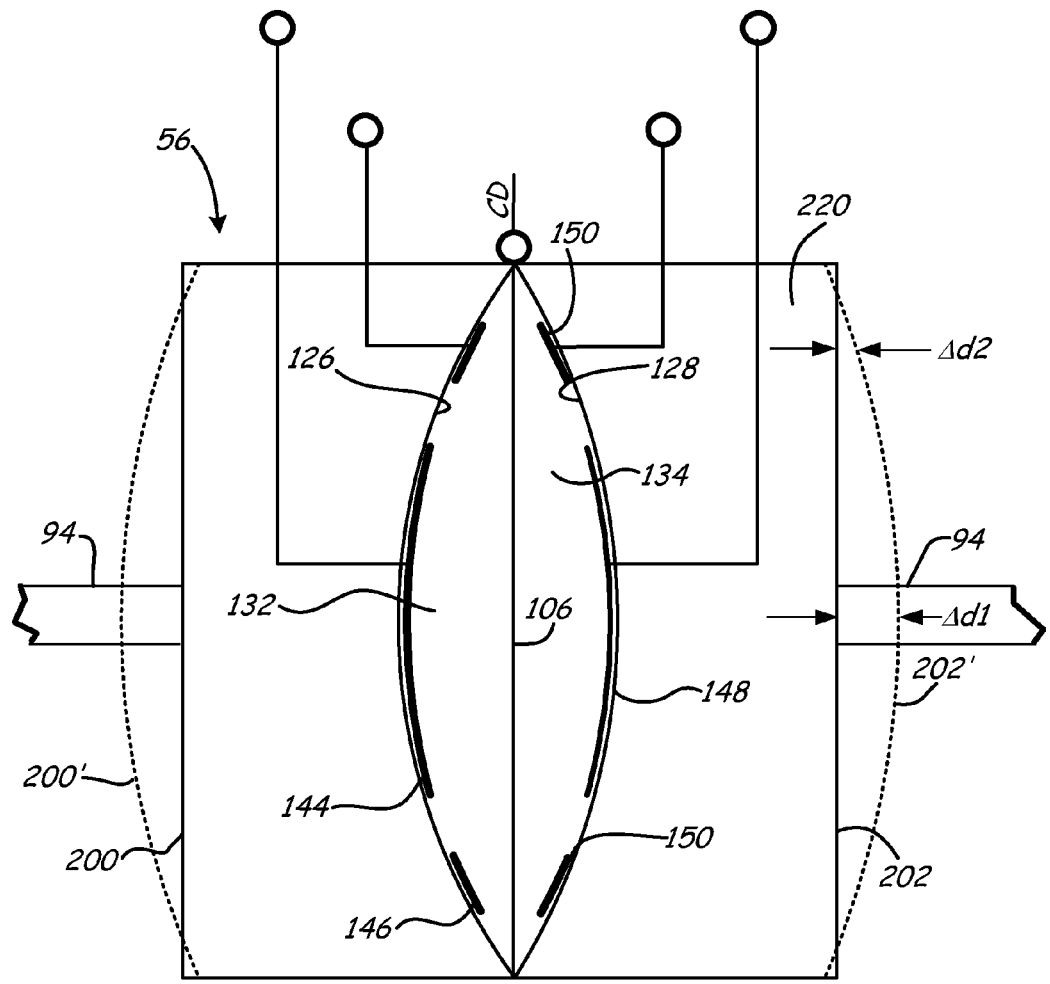
FIG. 4 is a simplified cross sectional view of pressure sensor for use in illustrating operation of the present invention.

FIG. 4 is a simplified cross-sectional view of sensor 56 used to illustrate operation of the present invention. FIG. 4 illustrates various electrical connections to electrodes 144, 146, 148, and 150.

During operation of pressure sensor 56, the line pressure applied to the pressure sensor through the capillary tubes 94 (see FIG. 3) causes a deformation in the body 220 of pressure sensor 56. While both pressures $P_1$ and $P_2$ cause a deformation of the sensor. The sensor will be based upon three different conditions. A high upstream pressure and a low downstream pressure, and a low upstream pressure and a high downstream pressure and a high upstream pressure with a high downstream pressure. The sensor will measure a line pressure defined as the maximum of the upstream or downstream pressure. The applied line pressure causes a pressure difference between the pressure within body 220 and the internal environment of the pressure transmitter. This pressure differential causes the deformation in the body 220. In the example shown in FIG. 4, a greatly exaggerated deformation is shown. Specifically, the applied line pressure causes exterior walls 200 and 202 of body 220 to expand outward to the positions shown in phantom at 200' and 202'.

The present invention provides a technique for measuring line pressure based upon the distortion, or bending, along the edge of the pressure sensor 56. This bending is illustrated by the dashed lines labeled 200' and 202'. Near the center end of the sensor 56, the rate of displacement is illustrated as $\Delta d1$. As illustrated in FIG. 4, the displacement near the center of sensor 56 $\Delta d1$ is greater than the displacement near the edge $\Delta d2$. The line pressure is related to both $\Delta d1$ and $\Delta d2$, as well as relative measurement such as $\Delta d1 - \Delta d2$ or $\Delta d1/\Delta d2$.

Figure 5:
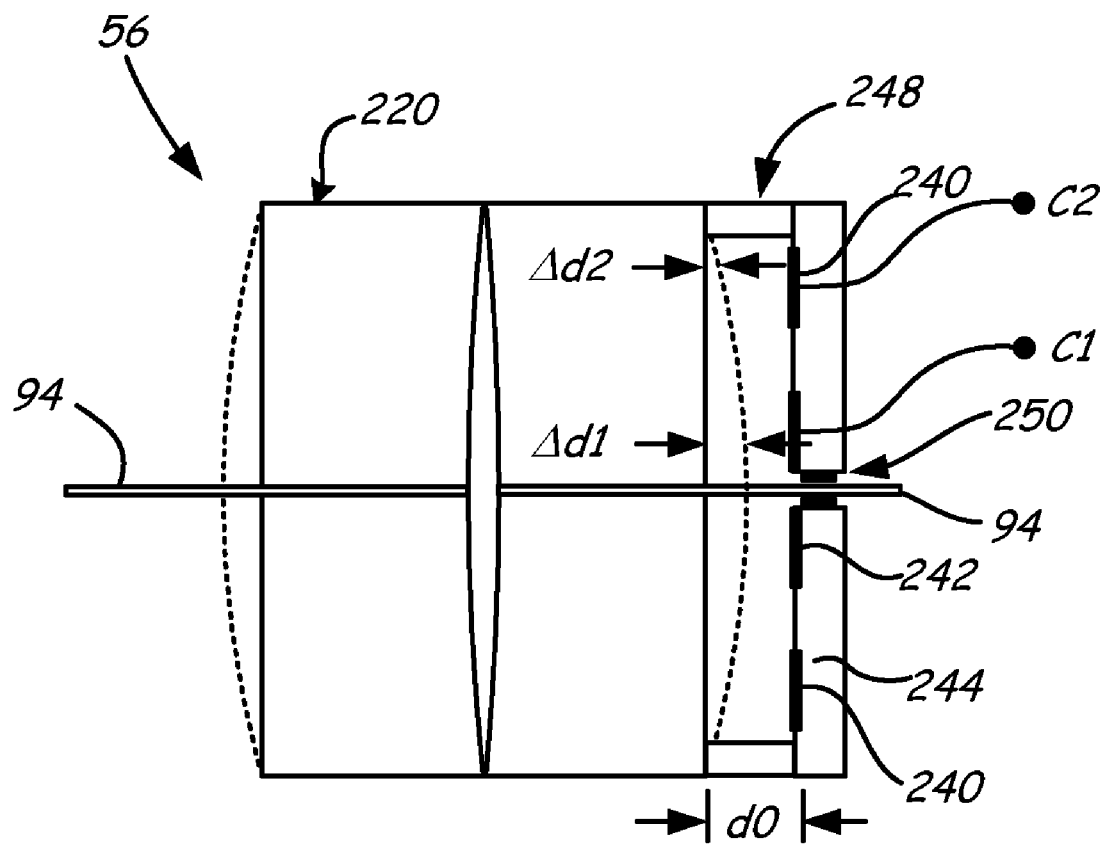
FIG. 5 is a cross sectional view of pressure sensor including electrodes used to measure line pressure.

FIG. 5 is a simplified cross-sectional view of sensor 56 illustrating one technique to measure displacement $\Delta d1$ or $\Delta d2$. In the example embodiment of FIG. 5, the displacements are monitored by placing annular capacitive electrodes 240 and 242 proximate one end of sensor 56. The electrodes 240, 242 are carried on an insulated backing plate 244 supported by support 248. In one configuration, support 248 comprises a tube or the like. Support 248 can be attached continuously, or at points, to the sensor 56 and the insulated backing plate 244. In another example configuration, support 248 comprises multiple supports, or has a configuration which does not continuously extend along the outer circumference of sensor 56. In another example configuration, insulated backing plate 244 is mounted to capillary tube 94 using a bond 250. Such a configuration may optionally include support 248. In such a configuration, insulating backing plate 244 may or may not be attached to support 248. Preferably, backing plate 244 is configured to either experience little distortion in response to line pressure or distort in a manner which contributes to $\Delta d1$ and/or $\Delta d2$ to thereby increase the sensitivity of the device.

Electrical connections are provided to electrodes 240 and 242 and can be used to measure capacitances C1 and C2 which are formed with respect to the sensor body 220.

The nominal distance d0 between electrodes 240 and 242 and the sensor can be controlled when the insulated backing plate 244 is mounted with respect to the sensor body 220. The dielectric material between electrodes 240, 242 and the sensor body can be the ambient gas that surrounds the sensor 56, for example nitrogen. In one preferred embodiment, the capacitors C1 and C2 have the same value (i.e. C1=C2) in a rest condition. In such a configuration, nominal changes in the spacing d0, or in the dielectric constant of the gas, do not affect the difference between C1 and C2 since at rest C1−C2=0. Somewhat improved redundancy can be obtained by placing capacitor sensors on both sides of the sensor 56. In one configuration, a temperature sensor is also provided and used to provide temperature compensation to line pressure measurements due to variations in the capacitance C1, C2 based upon temperature. The deformation sensor 59 illustrated in FIG. 2 as thus formed by the electrodes shown in FIG. 5 which are mounted externally to the sensor body in a manner whereby their capacitance varies in response to deformation of the sensor body.

Although the present invention has been described with reference to preferred embodiments, workers skilled in the art will recognize that changes may be made in form and detail without departing from the spirit and scope of the invention. For example, the sensor body and the insulated backing plate do not need to be circular. Various attachment techniques can be used to reduce the stress which is applied to the backing plate. As used herein, "fluid" includes liquids and gasses or mixtures that may include solids.

What is claimed is:

1. A pressure sensor assembly for sensing a pressure of a process fluid, comprising:
   a sensor body having a cavity formed therein and first and second openings to the cavity configured to apply first and second pressures;
   a diaphragm in the cavity separating the first opening from the second opening responsive to a differential pressure;
   a first electrode mounted outside of the sensor body arranged to form a first capacitance with the sensor body, wherein the first capacitance varies in response to line pressure of the process fluid due to deformation of the sensor body; and
   measurement circuitry coupled to the electrode arranged to measure the line pressure based upon the first capacitance.

2. The apparatus of claim 1 including a second electrode mounted outside the sensor body and wherein a second capacitance is formed between the second electrode mounted and the sensor body.

3. The apparatus of claim 1 including a second electrode mounted outside of the sensor body and wherein the measurement circuitry has an output related to line pressure based upon a first capacitance measured using the first electrode and a second capacitance using the second electrode.

4. The apparatus of claim 1 including an insulating plate configured to carry the electrode.

5. The apparatus of claim 4 wherein the insulating plate is mounted to the sensor body.

6. The apparatus of claim 5 wherein the insulating plate is mounted to a support which mounts to the sensor body.

7. The apparatus of claim 4 wherein the insulating plate is mounted to a capillary tube coupled to the sensor body.

8. The apparatus of claim 1 including a differential pressure sensor associated with the diaphragm having an output related to differential pressure based upon movement of the diaphragm within the cavity.

9. The apparatus of claim 8 wherein the output is based upon a variable capacitance which is formed by the diaphragm.

10. The apparatus of claim 1 wherein the line pressure measurement is compensated based upon temperature.

11. A process transmitter for measuring pressure of the process fluid including the pressure sensor of claim 1.

12. A method for measuring differential pressure and line pressure of a process fluid comprising:
   mounting a deflectable diaphragm in a cavity in a sensor body;
   applying a first pressure of the process fluid to one side of the deflectable diaphragm in the cavity;
   applying a second pressure of the process fluid to another side of the deflectable diaphragm in the cavity;
   determining differential pressure based upon deflection of the deflectable diaphragm;
   forming a first capacitance with a first electrode positioned outside of the sensor body, the first capacitance formed between the electrode and the sensor body and having a capacitance which changes based upon deformation of the sensor body due to a line pressure of the process fluid; and
   determining a line pressure of the process fluid based upon changes in the capacitance.

13. The method of claim 12 including providing a second electrode mounted outside of the sensor body and wherein the line pressure is determined based upon a first capacitance measured using the first electrode and a second capacitance using the second electrode.

14. The method of claim 12 including determining differential pressure by measuring upon movement of the diaphragm within the cavity based upon a diaphragm capacitance.

15. The method of claim 12 including compensating the line pressure measurement based upon temperature.

* * * * *